(12) United States Patent
Suliman et al.

(10) Patent No.: US 7,289,920 B2
(45) Date of Patent: Oct. 30, 2007

(54) METHOD AND APPARATUS FOR CAPTURE OF GRID CHARACTERISTICS CORRESPONDING TO FLUCTUATION EVENTS

(75) Inventors: Alaadin M. Suliman, Tehachapi, CA (US); Lawrence Donald Willey, Bakersfield, CA (US)

(73) Assignee: General Electric Company, Schenectady, NY (US)

( * ) Notice: Subject to any disclaimer, the term of this patent is extended or adjusted under 35 U.S.C. 154(b) by 496 days.

(21) Appl. No.: 10/609,110

(22) Filed: Jun. 26, 2003

(65) Prior Publication Data

US 2004/0264082 A1  Dec. 30, 2004

(51) Int. Cl.
*G01R 19/165* (2006.01)

(52) U.S. Cl. .......................................... 702/64; 700/287
(58) Field of Classification Search .................. 702/60, 702/64–65, 183, 185; 700/286–288; 290/43–44, 290/54–55
See application file for complete search history.

(56) References Cited

U.S. PATENT DOCUMENTS

| | | | | |
|---|---|---|---|---|
| 4,410,806 A * | 10/1983 | Brulle | .......................... | 290/44 |
| 4,441,872 A * | 4/1984 | Seale | .......................... | 417/282 |
| 4,803,635 A * | 2/1989 | Andow | .......................... | 702/58 |
| 5,032,969 A * | 7/1991 | Eggers et al. | ............. | 363/21.11 |
| 5,406,495 A * | 4/1995 | Hill | .............. | 702/72 |
| 5,508,607 A * | 4/1996 | Gibson | .................... | 324/121 R |
| 5,652,485 A * | 7/1997 | Spiegel et al. | .............. | 318/147 |
| 5,973,481 A * | 10/1999 | Thompson et al. | ............. | 322/7 |
| 6,185,508 B1* | 2/2001 | Van Doorn et al. | ........... | 702/60 |
| 6,195,243 B1* | 2/2001 | Spencer et al. | ................ | 361/64 |
| 6,215,202 B1* | 4/2001 | Luongo et al. | ................ | 307/64 |
| 6,798,634 B2* | 9/2004 | Hoepken | ..................... | 361/152 |
| 6,810,339 B2* | 10/2004 | Wills | ........................... | 702/65 |
| 7,065,458 B2* | 6/2006 | Tran et al. | .................... | 702/66 |
| 2003/0151259 A1* | 8/2003 | Feddersen et al. | ............ | 290/44 |

\* cited by examiner

*Primary Examiner*—Eliseo Ramos-Feliciano
*Assistant Examiner*—Mary Catherine Baran
(74) *Attorney, Agent, or Firm*—Blakely, Sokoloff, Taylor & Zafman LLP

(57) ABSTRACT

The techniques described herein allow a wind turbine generator system to automatically capture voltage waveform data corresponding to a voltage disturbance event. Data corresponding to a period preceding the voltage disturbance event, during the event and a period of time after the event are captured and stored for further analysis. The sampling rate is relatively high compared to the frequency of the power provided by the generators.

47 Claims, 5 Drawing Sheets

METHOD AND APPARATUS FOR CAPTURE OF GRID CHARACTERISTICS CORRESPONDING TO FLUCTUATION EVENTS

FIELD OF THE INVENTION

The invention relates to wind turbine generators. More particularly, the invention relates to measurement of characteristics (e.g., voltage waveforms) corresponding to utility grid disturbance events.

BACKGROUND

Historically, wind turbines have been very small contributors to overall power generation to supply electrical grids. The low unit ratings (<100 kW) and the uncertain availability of wind sources causes wind turbine generators to have a negligible effect when power grid operators consider the security of the grid. However, wind turbine generators with ratings of 1.5 MW or more are now available. Furthermore, many power generation developers are installing wind farms having one hundred or more wind turbine generators. The "block" of power available from wind farms with 1.5 MW wind turbine generators is comparable to a modem gas turbine generator. Accordingly, wind turbine generators are increasingly feasible sources of power for the power grid.

In order to reliably supply power to the power grid, wind turbine generators (as well as other types of generators) must conform to power grid interconnection standards that define requirements imposed on power suppliers and large power consumers. In particular, a "low voltage ride through" (LVRT) requirement typically requires that a power generation unit must remain connected and synchronized to the grid when the voltage at the terminals of the generation unit fall to prescribed levels.

The LVRT requirement has been addressed in steam and gas turbine generators plants through use of vital electrical buses that are powered by DC power sources and by auxiliary buses connected to the generating units. These types of generation units are generally more resistant to voltage fluctuations than wind turbine generators.

In the past, wind turbine generators have been allowed to trip offline during a low voltage event. However, this does not satisfy LVRT requirements. Currently, wind turbine generators' specifications can require connection and synchronization with the power grid down to levels of 70% of rated voltage. These requirements can be accommodated through, for example, increased capacity in various components (motors, generators, converters, etc.). However, more severe voltage fluctuations, for example, voltages at 30% of rated voltage cannot be accommodated using these techniques.

SUMMARY

A voltage disruption monitoring and capture system is described. A plurality of generators coupled to supply power to a power network. A voltage sampling circuit is coupled to the generators to sample voltage levels of the power network. The sampling rate of the voltage sampling circuit is greater than a frequency of the power supplied to the power network. A trigger circuit is coupled with the voltage sampling circuit to, in response to a triggering event, cause samples corresponding to a predetermined time period preceding the triggering event and a predetermined time period after the triggering event to be captured.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

The techniques described herein allow a wind turbine generator system to automatically capture voltage waveform data corresponding to a voltage disturbance event. Data corresponding to a period preceding the voltage disturbance event, during the event and a period of time after the event are captured and stored for further analysis. The sampling rate is relatively high compared to the frequency of the power provided by the generators.

Figure 1:
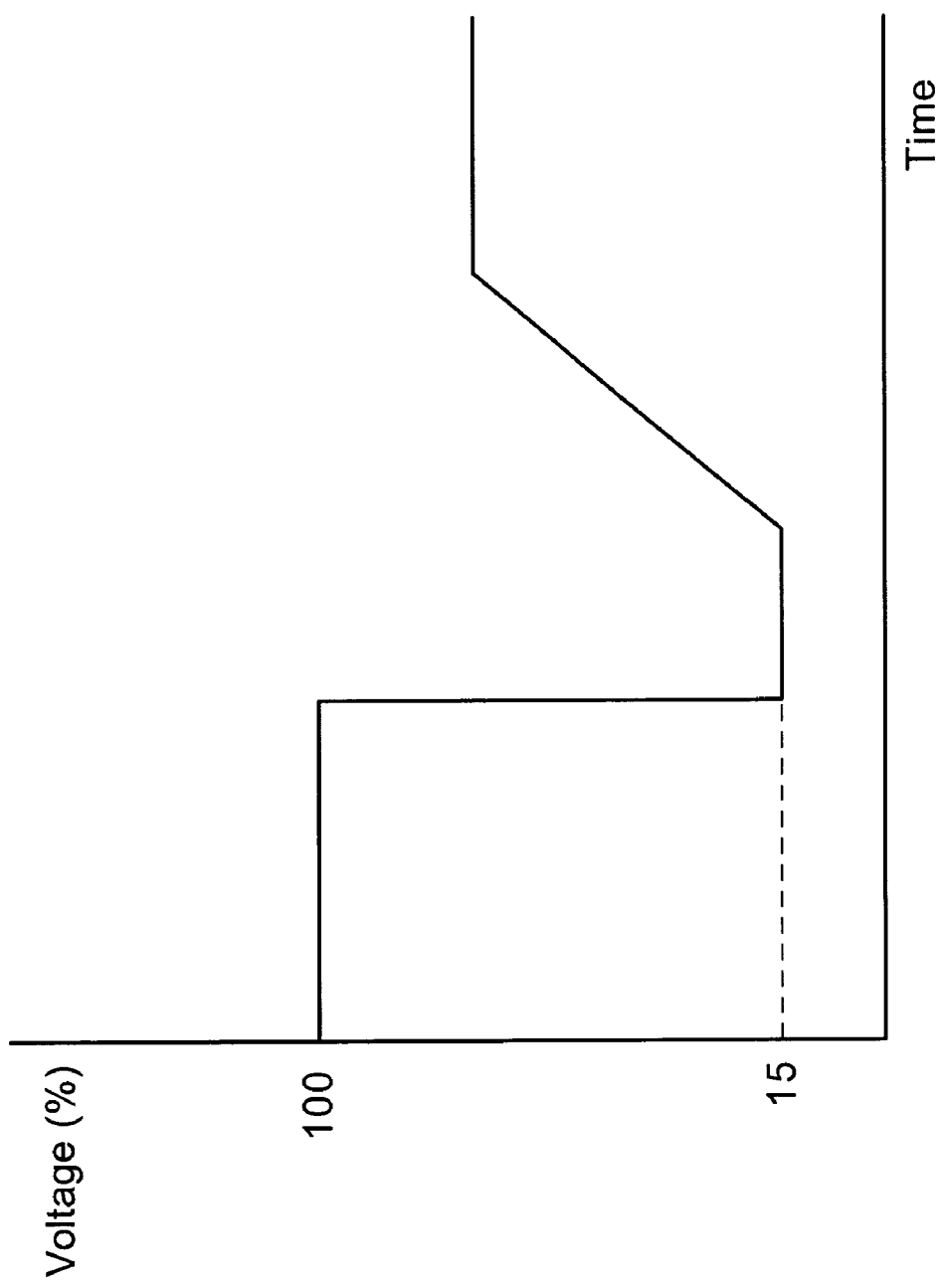
FIG. 1 is graph of voltage versus time for an example voltage fluctuation event.

FIG. 1 is graph of voltage versus time for an example voltage fluctuation event. In the example of FIG. 1, the voltage drops from 100% of the generation unit's rated voltage to 15% of the generation unit's rated voltage. After the fluctuation, the voltage returns to a higher level.

Wind turbine systems are designed to maintain operation during a voltage fluctuation where the grid voltage drops below the rated voltage (e.g., 70%, 50%, 30% of rated voltage). This is referred to as "low-voltage ride through" or "LRVT." Voltage fluctuations can also occur when the grid voltage exceeds rated voltage (e.g., 105%, 110%, 120% of rated voltage). Severe voltage fluctuation events when the fluctuation exceeds the system's capacity to operate cause the systems to trip or to fault.

As described in greater detail below, high-speed voltage waveform acquisition equipment capable of capturing data with less than one second intervals can be used to capture waveforms corresponding to voltage fluctuation events. Capture of the voltage waveforms can be selectively triggered such that, for example, events that caused one or more wind turbine generator systems to trip can be analyzed to determine whether the wind turbine generator system functioned correctly.

Figure 2:
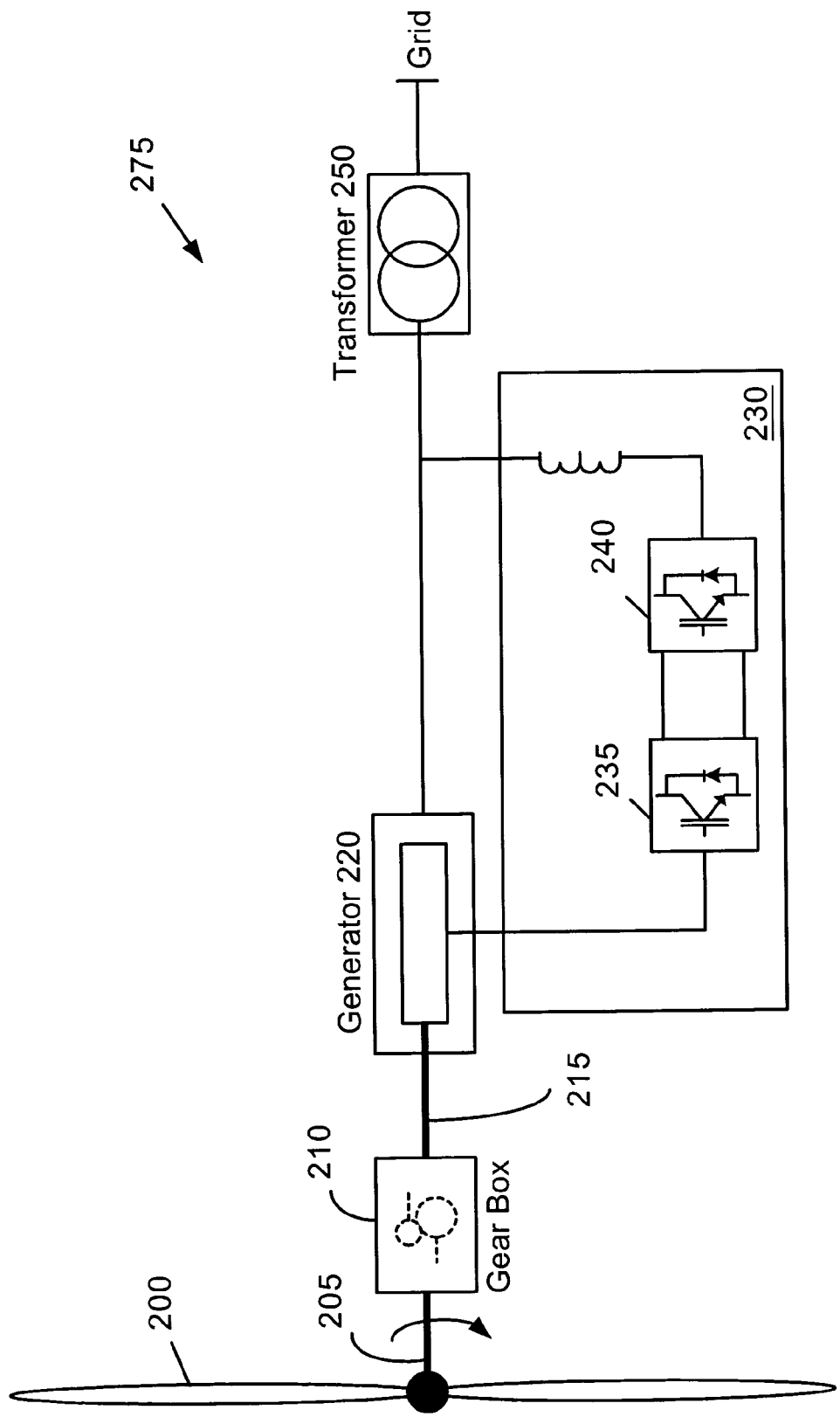
FIG. 2 is a schematic illustration of one embodiment of a wind turbine generator.

FIG. 2 is a schematic illustration of one embodiment of a wind turbine generator. Wind imparts energy to blades 200 connected to rotor 205. The pitch of blades 200 can be varied by control devices (not illustrated in FIG. 2). The pitch control system varies the pitch of blades 200 as wind speed varies to control rotor speeds and prevent overspeeds. Typical rotor speeds are in the range of 10-20 revolutions per minute; however, other rotor speed ranges can also be supported. Pitching of blades is known in the art.

Rotor 205 is connected to gear box 210 that increases the shaft speed to a desired range. Typical gear ratios are in the range of 100:1 such that rotor speeds of 10-20 revolutions per minute result in 1000-2000 revolutions per minute at high-speed shaft 215. Other gear ratios and other speeds can also be used. High-speed shaft 215 drives generator 220 at variable speeds, depending on the wind speed. Generator 220 produces a torque that balances the torque produced by rotor 205. Without other components, generator 220 would produce a variable frequency power output that would be unsuitable for connection to the power grid.

Power converter 230, which includes back-to-back inverters 235 and 240, provides variable frequency power to the rotor of generator 220. The combination of the variable rotor speed and the variable frequency power to the generator rotor allows the generator to produce constant frequency power at voltage levels suitable for the power grid (e.g., 575 VAC). In one embodiment, inverters 235 and 240 are Integrated Gate Bipolar Transistor (IGBT) power inverters. Power inverters for use in wind turbine generators are known in the art and any appropriate power inverters can be used.

Transformer 250 matches the output of the wind turbine generator to the voltage of the local power grid. The overall control of wind turbine generator 275 is managed by a controller that operates the various systems of wind turbine generator 275. These systems include, for example, power converter 230, the pitch, lubricating and cooling systems (not illustrated in FIG. 2), and the yaw system. Many of these systems are sensitive to voltage fluctuations and could be damaged if the voltages of the wind turbine electrical system are too high or too low. In particular, the turbine controller monitors the wind speed and issues torque commands to power converter 230 and pitch commands to the pitch system so that the power output of wind turbine generator 275 matches the wind conditions and the rotor speed is held below the overspeed limit.

When a voltage fluctuation occurs during which the grid voltage drops below a specified level (e.g., 30% of rated voltage), the turbine controller causes the components of the wind turbine system to trip, or enter into a fault condition, in which the components of the wind turbine system cease to operate. The voltage fluctuation may be less than one second, which requires the ability to capture the voltage waveform at a rate of multiple samples per second.

Figure 3:
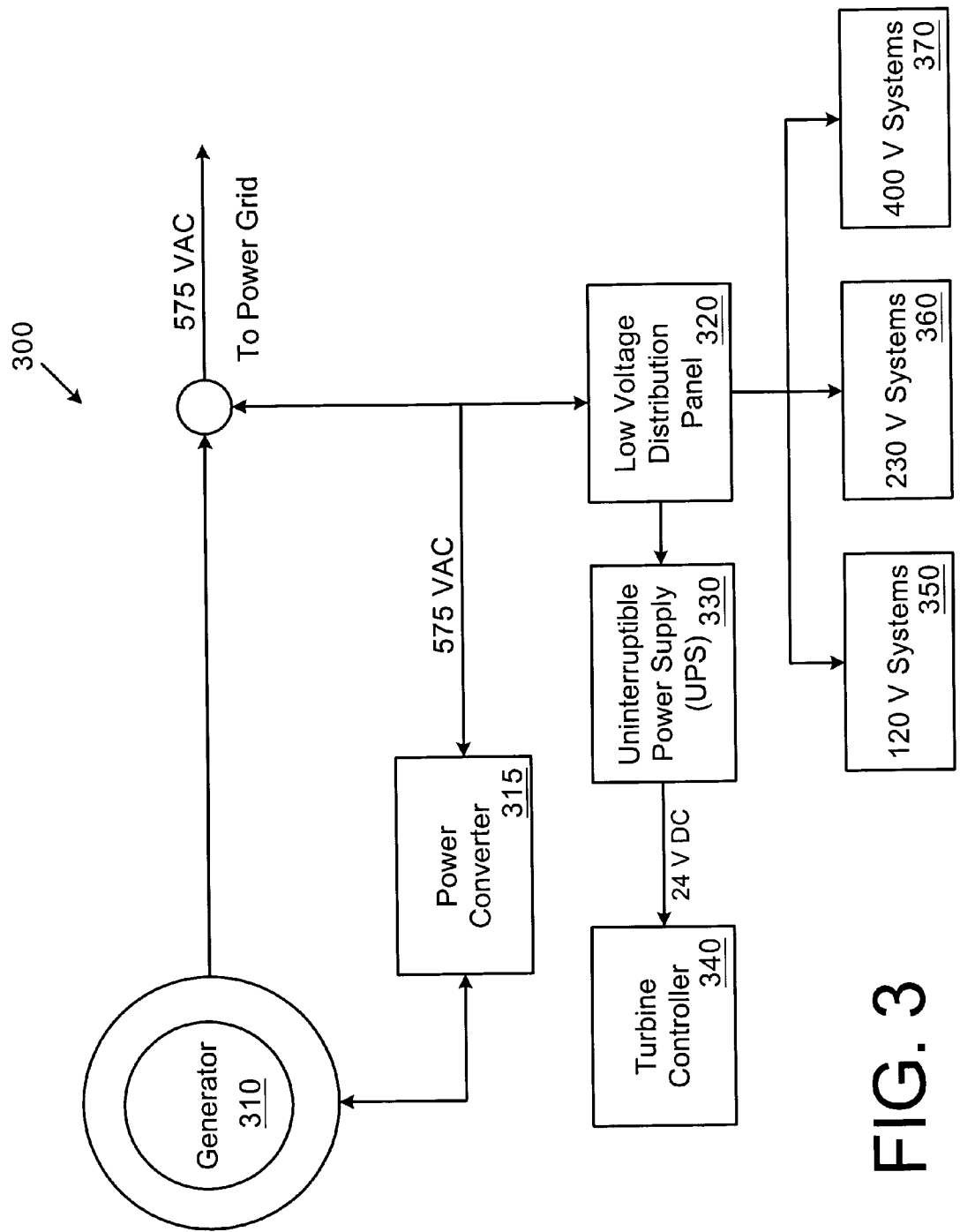
FIG. 3 is a block diagram of one embodiment of an electrical system of a wind turbine generator.

FIG. 3 is a block diagram of one embodiment of an electrical system of a wind turbine generator. The example of FIG. 3 provides specific voltages that are typical for wind turbine generators in the 1.5 MW class for use in the United States. Other similar voltages can be used for 50 Hz wind turbine generators. In general, higher voltages are used for higher power ratings and lower voltages are used for lower power ratings. However, the overall architecture is applicable for many different types and sizes of wind turbines.

Generator 310 provides AC power to the power grid as well as to other components of wind turbine electrical system 300. In one embodiment, generator 310 provides 575 V (which is the rated voltage of the generator); however, any voltage can be provided. Generator 310 also provides power to power converter 315, which operates as described above with respect to FIG. 2, and to low voltage distribution panel (LVDP) 320.

In one embodiment, LVDP 320 includes a transformer to transform the 575 V power received from generator 310 to 120 V, 230 V and 400 V power for use throughout the wind turbine (120 V systems 350, 230 V systems 360 and 400 V systems 370, respectively). Other and/or additional power supply levels can be provided as desired. The wind turbine generator systems connected to LVDP 320 include, for example, the pitch system controls and motors, the yaw system controls and motors, various lubrication and cooling systems, electrical receptacles and lights, heaters and miscellaneous equipment.

In one embodiment, LVDP 320 provides 24 V DC power to turbine controller 340 through uninterruptible power supply (UPS) 330. UPS 330 provides power to turbine controller 340 in the event that LVDP 320 is unable to provide necessary power to turbine controller 340. UPS 330 can be any type of uninterruptible power supply, for example, a battery system, a photovoltaic system or any other power storage system known in the art. In one embodiment, UPS 330 does not have sufficient capacity to energize all of the electrical loads served by LVDP 320.

Some of the components of the configurations of FIGS. 2 and 3 are susceptible to damage caused by voltage fluctuations in the high voltage (575 V) power supply. Higher voltages can cause failures such as, for example, insulation breakdown and high currents in certain components. Low voltages can cause components such as, for example, motors to draw excessive current to counteract the lower voltages. The high currents can lead to blown fuses, tripped circuit breakers or excessive heating if the low voltage condition persists.

Figure 4:
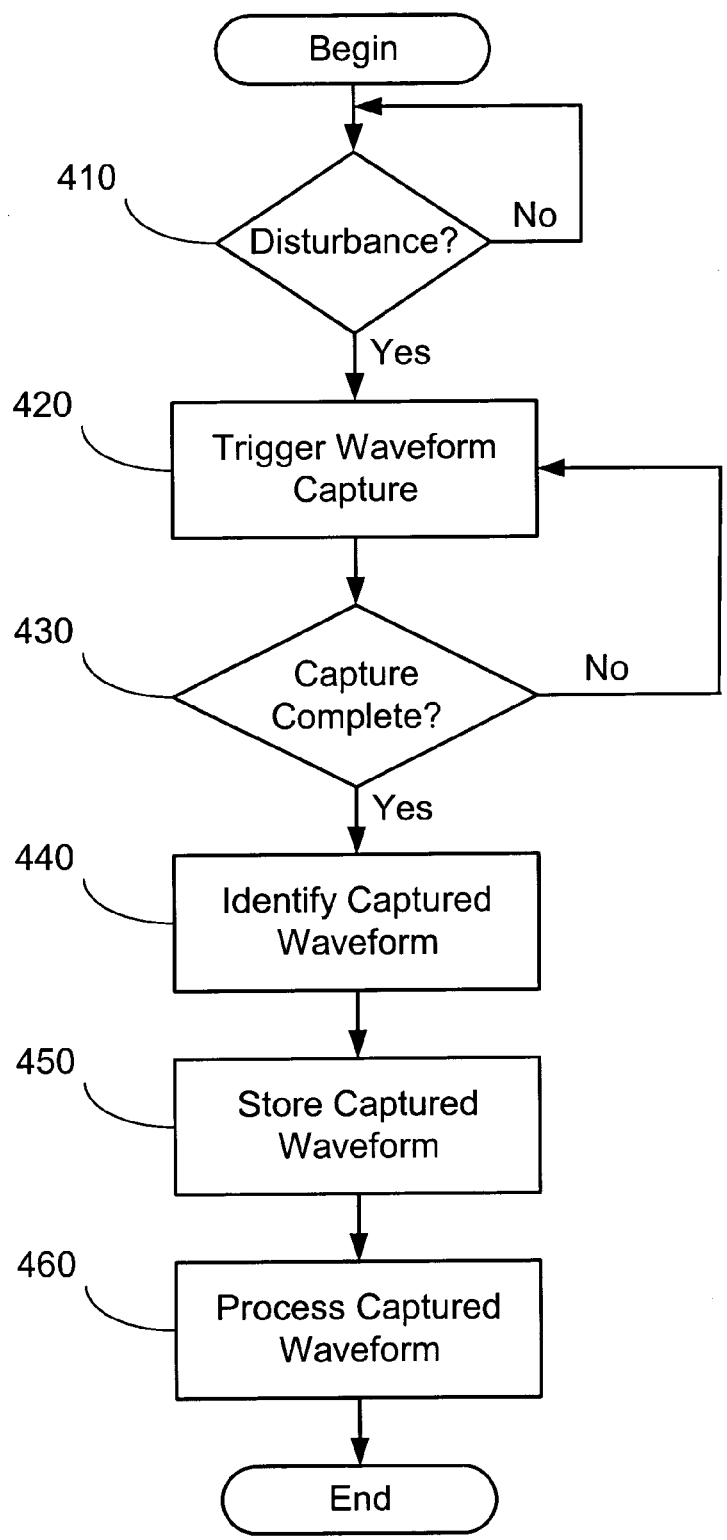
FIG. 4 is a flow diagram of one embodiment of a technique for capturing voltage waveforms corresponding to high-speed voltage fluctuations.

FIG. 4 is a flow diagram of one embodiment of a technique for capturing voltage waveforms corresponding to high-speed voltage fluctuations. The waveforms captured can correspond to voltage at, for example, a substation or a point of common coupling at a wind farm.

A monitoring system determines whether a disturbance has occurred, 410. A disturbance is defined by a voltage that exceeds a predetermined ceiling threshold or a voltage that drops below a predetermined floor threshold. In one embodiment, three transformers (one for each phase of a three-phase power supply) provide a lower voltage version of the voltage being supplied, for example, by a wind farm to a substation. The lower voltage is sampled by high-speed voltage monitoring equipment.

"High-speed voltage monitoring equipment" refers to voltage monitoring devices capable of sampling a voltage signal multiple times during a typical grid voltage disturbance. As an example, in a 60 Hertz system a quarter cycle sampling rate can be used, which provides a voltage sample approximately every 4.167 ms. Other sampling rates, either faster or slower, can be used.

Various ceiling and floor thresholds can be used to define a voltage disturbance. For example, voltage that exceeds a ceiling threshold of 110% of rated voltage can be considered a disturbance. Other ceiling thresholds, for example, 105%, 108% 115% or 120% or rated voltage can be used. As another example, a voltage that is less than a floor threshold of 30% of rated voltage can be considered a disturbance. Other floor thresholds can also be used, for example, 70%, 50%, 48% or 33% of rated voltage can be used.

If no disturbance is detected, 410, the system continues to monitor the voltage level for a disturbance. If a disturbance is detected, 410, the monitoring system triggers a waveform capture, 420. In one embodiment, the sampled voltage values that correspond to the monitored voltage are continually sampled and stored in a (e.g., non-volatile) memory that is periodically overwritten by more recent sample data, for example, a circular buffer. By continually storing voltage samples in the buffer, the samples that precede the voltage disturbance can be analyzed with the voltage disturbance.

In one embodiment, 20 samples prior to the triggering event and 40 samples after the conclusion of the triggering event are captured. Other sample ranges, for example 40 samples before and 60 samples after the triggering event can be captured. In one embodiment, capture continues, 430, until a predetermined number of samples (e.g., 40) after the monitored voltage returns to a level between the floor and ceiling thresholds.

When the capture is complete, the captured waveform is identified, 440. Identification can include, for example, a time and date stamp for a file that stores the captured voltage samples. Other information, for example, the location of the voltage disturbance can also be included in the captured waveform identification information.

The captured waveform data is stored in a non-volatile memory for later analysis, 450. In one embodiment, the monitoring and/or capture equipment transmits that captured waveform and identification information to a server or monitoring terminal over a network. Any data format or transmission protocol known in the art can be used to transmit and store the captured waveform data.

The captured waveform can be processed to provide analysis of the voltage disturbance, 460. Processing of the voltage waveform can include graphical representation of the voltage waveform for analysis purposes. Automatic classification and/or ranking of the voltage disturbance can also be provided in the processing.

For example, the voltage disturbance can be classified as a high-voltage disturbance (i.e., the voltage exceeds the ceiling threshold) or as a low-voltage disturbance (i.e., the voltage drops below the floor threshold). The voltage disturbance can also be classified as a long disturbance (e.g., the disturbance lasts less than one second) or as a short disturbance (e.g., the disturbance lasts longer than one second). Other classifications can also be provided.

The voltage disturbance can be ranked as, for example, a serious (e.g., wind turbine systems tripped off line) or a mild (e.g., wind turbine systems not tripped off line) disturbance. Other rankings can also be provided. Any combination of automated classification and ranking can be provided.

Figure 5:
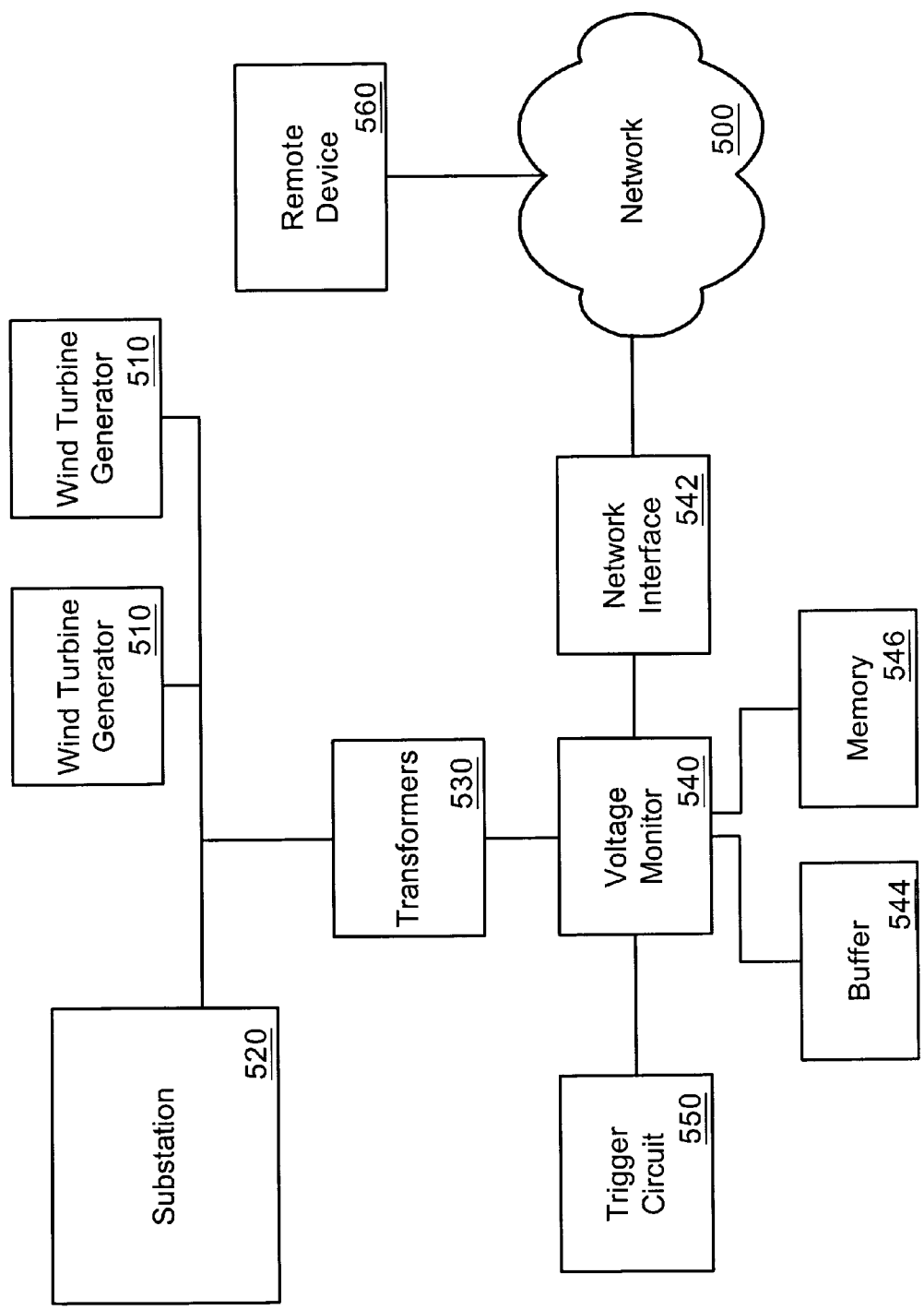
FIG. 5 is a block diagram of one embodiment of a system having multiple generators and voltage disturbance monitoring and capture functionality.

FIG. 5 is a block diagram of one embodiment of a system having multiple generators and voltage disturbance monitoring and capture functionality. Wind turbine generators 510 are configured to generate power in response to wind, for example, as described above. Two wind turbine generators are illustrated in FIG. 5, but any number of wind turbine generators can be connected to provide power as a wind farm. The wind turbine generators are coupled to substation 520. In one embodiment, the power provided by wind turbine generators 510 has a frequency of 60 Hertz for distribution in North America. Alternatively, the power frequency can be 50 Hertz for distribution in, for example, Europe.

Transformers 530 are coupled to the power lines over which wind turbine generators 510 provide power to substation 520. Transformers 530 provide a lower voltage signal corresponding to the voltage at substation 20. In one embodiment, transformers 530 represent a group of three transformers, one for each of three phases in a three-phase power system.

Voltage monitor 540 is coupled to receive the output voltages from transformers 530. Voltage monitor 540 periodically samples the voltage level output from transformers 530 and generates a signal indicating the magnitude of the voltage. The signal generated by voltage monitor 540 can be an analog signal or a digital signal. In one embodiment, voltage monitor 540 has a sampling rate corresponding to a one-quarter cycle of the power frequency. Thus, in a 60 Hertz power system, the sampling rate is 240 Hertz and in a 50 Hertz power system, the sampling rate is 200 Hertz. Other sampling rates and different relationships between power frequency and sampling rate can be used. The quarter-cycle sampling rate provides sufficient granularity to analyze voltage disturbances; however other sampling rates may be selected to provide a greater or lesser level of detail.

In one embodiment, the signals output by voltage monitor 540 are continually stored in buffer 544. In one embodiment, buffer 544 is a circular buffer and when buffer 544 is full, a subsequent entry is written over an oldest entry in buffer 544. Other buffering or storage techniques could be used. For example, all output signals from voltage monitor 544 can be stored on a mass storage device.

Trigger circuit 550 is coupled to voltage monitor 540 and monitors output signals from voltage monitor 540. When an output signal from voltage monitor 540 corresponds to a voltage that exceeds a predetermined ceiling threshold or is less than a predetermined floor threshold, trigger circuit 550 indicates that a voltage disturbance has occurred, which corresponds to the triggering event of the voltage at the substation not being within an acceptable operating range.

When triggering circuit 550 indicates a voltage disturbance, voltage monitor 540 causes a predetermined number of samples preceding the triggering event to be retrieved from buffer 544 and stored in memory 546. Voltage monitor 540 also causes samples during the voltage disturbance and a predetermined number of samples after conclusion of the voltage disturbance to be stored in memory 546. The samples corresponding to a voltage disturbance that are stored in memory 546 are referred to as the captured samples for the voltage disturbance.

In one embodiment, after the samples corresponding to a voltage disturbance have been captured, voltage monitor 540 provides a time and date stamp and/or other identification information for the captured samples. In one embodiment, voltage monitor 540 sends the captured samples to remote device 560 via network interface 542 and network 500. Network 500 can be any network, for example, a local area network or the Internet.

Remote device 560 can be any type of network device, for example, a server, a computer system that operates as a control terminal for a wind farm, a mobile device, etc. Remote device 560 can also provide automatic classification and/or ranking functionality as described in greater detail above.

Reference in the specification to "one embodiment" or "an embodiment") means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A system comprising:
  a plurality of generators coupled to supply power to a power network;
  a voltage sampling circuit coupled to the plurality of generators to sample voltage levels of the power network, wherein a sampling rate of the voltage sampling circuit is greater than a frequency of the power supplied to the power network; and
  a trigger circuit coupled with the voltage sampling circuit to, in response to a triggering event based on the voltage level of the power network, cause samples corresponding to a predetermined time period preceding the triggering event and a predetermined time period after the triggering event to be stored for subsequent analysis, wherein the triggering event comprises voltage fluctuations in which the voltage level of the power network either drops below a predetermined percentage of turbine rated voltage or exceeds a predetermined percentage of the turbine rated voltage.

2. The system of claim 1 wherein the power network comprises a utility grid.

3. The system of claim 1 wherein a triggering event comprises detection of a sampled voltage that exceeds a predetermined ceiling threshold.

4. The system of claim 3 wherein the predetermined ceiling threshold comprises a voltage greater than 110% of rated voltage for the generators.

5. The system of claim 3 wherein the predetermined ceiling threshold comprises a voltage greater than 105% of rated voltage for the generators.

6. The system of claim 1 wherein a triggering event comprises detection of a sampled voltage that exceeds a predetermined floor threshold.

7. The system of claim 6 wherein the predetermined floor threshold comprises a voltage less than 70% of rated voltage for the generators.

8. The system of claim 6 wherein the predetermined floor threshold comprises a voltage less than 30% of rated voltage for the generators.

9. The system of claim 1 wherein the predetermined period of time preceding the triggering event comprises approximately one cycle preceding the triggering event.

10. The system of claim 1 wherein the predetermined period of time preceding the triggering event comprises less than one cycle preceding the triggering event.

11. The system of claim 1 wherein the predetermined period of time after the triggering event comprises approximately one cycle after the triggering event.

12. The system of claim 1 wherein the predetermined period of time after the triggering event comprises less than one cycle after the triggering event.

13. The system of claim 1 wherein the samples are stored in a volatile memory of a first device and the captured samples are stored in a non-volatile memory of a second device.

14. The system of claim 1 further comprising a network interface coupled with the sampling circuit and to the triggering circuit to transmit the captured samples to a remote location.

15. The system of claim 1 wherein the samples are stored in a circular buffer and captured samples are retrieved from the circular buffer and stored in a non-volatile memory.

16. The system of claim 1 wherein the frequency is 60 Hertz.

17. The system of claim 16 wherein the sampling rate is 240 Hertz.

18. The system of claim 1 wherein the frequency is 50 Hertz.

19. The system of claim 18 wherein the sampling rate is 200 Hertz.

20. A method comprising:
monitoring a voltage output from a plurality of wind turbine generators coupled to a power network by sampling voltage levels of the power network, wherein a sampling rate of the voltage sampling circuit is greater than a frequency of the power supplied to the power network; and determining whether the sampled voltage levels are within a predetermined operating range based on rated voltage of the wind turbine generators;

designating a selected voltage sample as a triggering event if the selected voltage sample is not within the predetermined operating range; and capturing voltage samples in response to the triggering event, wherein the captured voltage samples correspond to a predetermined time period preceding the triggering event and a predetermined time period after the triggering event.

21. The method of claim 20 further comprising automatically classifying a voltage disturbance corresponding to the captured voltage samples.

22. The method of claim 20 further comprising automatically ranking a voltage disturbance corresponding to the captured voltage samples.

23. The method of claim 20 wherein the power network comprises a utility grid.

24. The method of claim 20 wherein a triggering event comprises detection of a sampled voltage that exceeds a predetermined ceiling threshold.

25. The method of claim 24 wherein the predetermined ceiling threshold comprises a voltage greater than 110% of rated voltage for the generators.

26. The method of claim 24 wherein the predetermined ceiling threshold comprises a voltage greater than 105% of rated voltage for the generators.

27. The method of claim 20 wherein a triggering event comprises detection of a sampled voltage that exceeds a predetermined floor threshold.

28. The method of claim 27 wherein the predetermined floor threshold comprises a voltage less than 70% of rated voltage for the generators.

29. The method of claim 27 wherein the predetermined floor threshold comprises a voltage less than 30% of rated voltage for the generators.

30. The method of claim 20 wherein the predetermined period of time preceding the triggering event comprises approximately one cycle preceding the triggering event.

31. The method of claim 20 wherein the predetermined period of time preceding the triggering event comprises less than one cycle preceding the triggering event.

32. The method of claim 20 wherein the predetermined period of time after the triggering event comprises approximately one cycle after the triggering event.

33. The method of claim 20 wherein the predetermined period of time after the triggering event comprises less than one cycle after the triggering event.

34. A article comprising a computer-readable medium having stored thereon instructions that, when executed, cause one or more processors to:
monitor a voltage output from a plurality of wind turbine generators coupled to a power network by sampling voltage levels of the power network, wherein a sampling rate of the voltage sampling circuit is greater than a frequency of the power supplied to the power network; and determine whether the sampled voltage levels are within a predetermined operating range based on rated voltage of the wind turbine generators;

designate a selected voltage sample as a triggering event if the selected voltage sample is not within the predetermined operating range; and capture voltage samples in response to the triggering event, wherein the captured voltage samples correspond to a predetermined time period preceding the triggering event and a predetermined time period after the triggering event.

35. The article of claim 34 further comprising instructions that, when executed by the one or more processors, cause the one or more processors to automatically classify a voltage disturbance corresponding to the captured voltage samples.

36. The article of claim 34 further comprising instructions that, when executed by the one or more processors, cause the one or more processors to automatically rank a voltage disturbance corresponding to the captured voltage samples.

37. The article of claim 34 wherein the power network comprises a utility grid.

38. The article of claim 34 wherein a triggering event comprises detection of a sampled voltage that exceeds a predetermined ceiling threshold.

39. The article of claim 38 wherein the predetermined ceiling threshold comprises a voltage greater than 110% of rated voltage for the generators.

40. The article of claim 38 wherein the predetermined ceiling threshold comprises a voltage greater than 105% of rated voltage for the generators.

41. The article of claim 34 wherein a triggering event comprises detection of a sampled voltage that exceeds a predetermined floor threshold.

42. The article of claim 41 wherein the predetermined floor threshold comprises a voltage less than 70 of rated voltage for the generators.

43. The article of claim 41 wherein the predetermined floor threshold comprises a voltage less than 30% of rated voltage for the generators.

44. The article of claim 34 wherein the predetermined period of time preceding the triggering event comprises approximately one cycle preceding the triggering event.

45. The article of claim 34 wherein the predetermined period of time preceding the triggering event comprises less than one cycle preceding the triggering event.

46. The article of claim 34 wherein the predetermined period of time after the triggering event comprises approximately one cycle after the triggering event.

47. The article of claim 34 wherein the predetermined period of time after the triggering event comprises less than one cycle after the triggering event.

* * * * *